United States Patent

Coffee

[11] Patent Number: 6,024,655
[45] Date of Patent: Feb. 15, 2000

[54] MAP-MATCHING GOLF NAVIGATION SYSTEM

[75] Inventor: John R. Coffee, Gilbert, Ariz.

[73] Assignee: Leading Edge Technologies, Inc., Chandler, Ariz.

[21] Appl. No.: 08/829,678

[22] Filed: Mar. 31, 1997

[51] Int. Cl.$^7$ .................................................. G06F 15/50
[52] U.S. Cl. .................. 473/407; 473/409; 342/451; 342/457; 701/216; 701/217
[58] Field of Search .................................. 473/407, 409, 473/137; 342/457, 451; 701/200, 207, 208, 216, 224, 300, 213, 214, 217

[56] References Cited

U.S. PATENT DOCUMENTS

| | | | |
|---|---|---|---|
| 4,480,310 | 10/1984 | Alvarez | 701/217 |
| 4,698,781 | 10/1987 | Cockerell, Jr. | 701/207 |
| 4,703,444 | 10/1987 | Storm, Jr. et al. | 342/463 |
| 4,796,191 | 1/1989 | Honey et al. | 701/208 |
| 4,963,864 | 10/1990 | Iihoshi et al. | 701/208 |
| 5,044,634 | 9/1991 | Dudley | 473/169 |
| 5,056,106 | 10/1991 | Wang et al. | 375/200 |
| 5,170,165 | 12/1992 | Iihoshi et al. | 701/208 |
| 5,311,195 | 5/1994 | Mathis et al. | 342/357.14 |
| 5,364,093 | 11/1994 | Huston et al. | 473/407 |
| 5,469,175 | 11/1995 | Boman | 473/407 |
| 5,469,360 | 11/1995 | Ihara et al. | 701/208 |
| 5,483,456 | 1/1996 | Kuwahara et al. | 701/215 |
| 5,488,559 | 1/1996 | Seymour | 701/208 |
| 5,685,786 | 11/1997 | Dudley | 473/409 |
| 5,689,431 | 11/1997 | Rudow et al. | 701/213 |

OTHER PUBLICATIONS

"Overview of Differential GPS Methods", E. Blackwell; SRI International; Jan, 1985.

*Primary Examiner*—Valencia Martin-Wallace
*Attorney, Agent, or Firm*—Blank Rome Comisky & McCauley, LLP

[57] ABSTRACT

A method for calibrating and updating a golf course position, yardage and measurement system for golf carts that utilize dead reckoning navigation, to avoid gradual buildup of error from components of the dead reckoning system as the golf cart is being driven on the course during play, for the purpose of aiding golfers in playing the course by displaying distance measurements between the golf cart and various course features of interest. In one embodiment, the method includes storing a map of the course golf cart path in the database of the cart navigation system, determining from a comparison of the golf cart position in the dead reckoning navigation system and the stored golf cart path whether the golf cart is on the cart path during at least a part of the play of each hole; and, if so, calibrating and updating the dead reckoning navigation system according to a correction of error in the indicated position of an icon representing the golf cart relative to the cart path on a display screen in the cart to restore the icon to the cart path. In another embodiment, the travel of the cart is compared to the meanderings of the cart path on the stored map by comparing the dead reckoning trajectory of the cart to sequences of segments along the cart path until a pathway trajectory is found that closely matches the trajectory of the golf cart; and then correcting the indicated position of the golf cart accordingly, by which to calibrate and update the dead reckoning navigation system.

7 Claims, 6 Drawing Sheets

MAP-MATCHING GOLF NAVIGATION SYSTEM

BACKGROUND OF THE INVENTION

The present invention relates generally to position, distance measuring, and navigation systems, and more particularly to improvements in a system for determining position, distance measuring, navigation, and feature and related information on golf courses to enhance the enjoyment of the game, speed of play, and efficiency of course management.

In golf players are more comfortable and more likely to excel on courses with which they are familiar. It is customary for a golfer on a new or little-played course to seek to gain at least some familiarity with the layout of each hole before starting play. Armed with this information, the golfer can approach each tee box during play of the course, knowing, for example, whether the particular hole is a 'dog leg left', a 'dog leg right', or straight; the general locations of hazards, such as sand traps, bunkers, and water traps on the hole; and locations of range postings, if any, for calculating yardage from the golfer's location to the front and rear of the green, the pin (cup), a hazard, and a desired lay up position for the green approach shot.

Golf courses have traditionally made available course layout and feature information booklets in the pro shop, for just such purposes. Yardage markers typically are placed at sprinkler heads along each hole, to provide range information from that point to the center of the green. These serve as aids to the player, but they also contribute to slowing the pace of play of the course. Slow play has an adverse effect on the course's daily revenue, as well as on other golfers' enjoyment of the game.

Proposals made to improve golf course information systems include use of buried electrical wires in various layouts on the course for interaction with mobile overland components (e.g., U.S. Pat. No. (USPN) 5,044,634 ("the '634 patent"); and use of radio direction finding or triangulation techniques (e.g., U.S. Pat. No. 4,703,444 ("the '444 patent") and U.S. Pat. No. 5,056,106).

More than twenty years ago, the U.S. government established a Global Positioning System (GPS) that uses space satellites and ground based stations to determine distance, range, and position, primarily for defense purposes, but which has found many uses for such information in various industrial and commercial applications. Earth-orbiting satellites provide reference points from which to determine the position of a point on or near the earth, using ground-based receivers. The satellite orbits are monitored by the ground station GPS receivers, and the travel times of signals received from the satellites are used to measure distance to each satellite. Each signal from a satellite is coded to permit the receiver to determine the elapsed time between transmission of the signal from the respective satellite and reception at the GPS receiver antenna, and thereby to calculate the distance as the product of elapsed time and speed of light. Receivers are not restricted to large ground stations, but may be portable, mobile and hand-held units for a multitude of private navigation, position and distance-measuring systems.

Distance measurements to three GPS satellites are used to accurately define the position of an object such as a GPS receiver, which may be stationary or moving, on or near the earth's surface. A fourth satellite enables verification of clock timing in the GPS system. With several satellites in "view", and using a computer, distances between objects can theoretically be measured almost instantaneously with great accuracy. But as a practical matter even small errors that typically occur in the calculated measurement of satellite signal travel time from system and natural phenomena can substantially reduce the accuracy of the distance and position calculations. Error causing phenomena include atmospheric propagation, receiver contributions, satellite ephemeris, and satellite clock. Errors have been purposely introduced in the satellite signals by the government to deny civilian users full accuracy. The combined effect of these errors can be as high as 100 meters or so.

In co-pending patent application Ser. Nos., 08/423,295 and 08/525,905, filed Apr. 18, 1995 and Sep. 8, 1995, respectively, assigned to the same assignee as the present application ("the '295 and '905 applications"), improvements are disclosed in golf course positioning and yardage measuring systems utilizing differential GPS (DGPS) (see, for example, Blackwell, "Overview of Differential GPS Methods", *Global Positioning System*, vol. 3, pp. 89–100, The Institute of Navigation, Washington, D.C. (1986)). With DGPS, errors in distance measuring applications are reduced by broadcasting error correction information from a ground receiver of known location in the vicinity of the user. The difference between a known fixed position of a GPS receiver and its position calculated from the satellite GPS signal fixes the error in the signal, and a continuous correction is provided for all other receivers, fixed or mobile, in the reception area. Knowing the error allows all distance and position calculations at the user's receiver to be corrected.

The golf course positioning and yardage measuring systems of the '295 and '905 applications use unique filtering algorithms, among other things, to offer much greater accuracy and reliability than would be found with conventional DGPS systems. An efficient, yet inexpensive communications network is used for data transmission between a base station and golf carts, with a variable length communication network that allows golf carts to be readily added or removed from the network. The systems of those co-pending applications employ high resolution color graphics displays on board the golf carts and at the course administrator's base station. Other advantages include detecting when the golf cart is within predetermined zones or regions of the course for use in unique features such as automatic display of the current hole on the cart monitor, measuring the pace of play for each hole, and providing automatic pop-up golf tips and advertisements on the cart monitor as the cart transitions from one hole to the next. The monitor is mounted in the roof of the cart in a way that gives the user excellent color readability in sunlight.

The PROLINK™ yardage and course management system disclosed in the '295 and '905 applications (PROLINK is a registered trademark of Leading Edge Technologies, Inc. of Chandler, Ariz., the assignee of the invention disclosed herein and in the '295 and '905 applications) includes a golf cart-based subsystem (or, alternatively, a hand-held or other roving unit) that uses state-of-the-art DGPS technology, together with various enhancements in—hardware and software. The system creates, stores, and displays a color graphical representation or map of the golf course on a video monitor in the cart or a liquid crystal display ("LCD") of a hand-held unit. Each hole of the course is selectively displayed with all of its hazards and features, with an icon representing the fixed or changing position of the roving unit superimposed in real time on the map of the hole being played. The golfer is provided by the system with an accurate measurement of the distance from the current position of the cart (e.g., at the tee box or other location on the hole) to the current pin placement, a hazard, or any other feature of the hole.

The PROLINK™ system provides many advantages to the golfer without burdening or significantly changing the way the course or any particular hole is played, or how business is conducted by course management—advantages such as real-time, accurate indications of distance (typically within two meters) from the cart to significant course features—green, pin, hazards on fairway, etc.; a relatively large, high resolution, color display with the capability for selection of a map of the entire course or any individual hole or other detailed feature; and a capability of individualize communications and messaging to and from the cart. The hole display and yardage functions in the cart system are activated automatically as the cart approaches the tee box at commencement of play of each hole. A movable cursor on the display allows the player to point to any feature on the displayed map to obtain a precise yardage measurement from the position of the cart. An automatic zoom feature increases the selected target area resolution, such as to view the contour of the green or the details of a particular hazard. The PROLINK™ system also enables the player to make consistently better and faster club selection from the information concerning target distance and hole layout.

The course management portion of the PROLINK™ system includes a base station computer unit, receiver/transmitter unit and video monitor in the clubhouse (or other desired location) to give the course administrator better insight into daily operations and revenues by providing a capability to identify, locate and monitor movement of every golf cart on the course in real-time; to use that knowledge to pinpoint and analyze the cause of bottle-necks on the course; to compile an extensive computerized data base useful for statistical insight into course operations and techniques for instituting improvements; and to communicate with all carts on the course, and to enhance course revenues through advertising and promotions broadcast to the cart monitors.

The PROLINK™ system also employs a technique and method for collecting survey data to map the layout of the golf course including such features as tee boxes, greens, fairways, cart paths, water hazards and sand traps. The collected survey data is post-processed and efficiently stored in memory in vector form for later retrieval and display. This data representing the golf course layout is used to efficiently determine the location of a golf cart relative to predetermined zones or regions. The system uses a zone detection algorithm and creates a number of different zones corresponding to areas such as features or portions of holes on the course. Accordingly, the PROLINK™ system can detect a golf cart within an established zone on the hole being played or elsewhere on the course from the cart coordinates. The zone detection algorithm enables various features of the system to be implemented, such as automatic hole display on the cart monitor as the cart enters the tee box zone of a new hole, and automatic pop-up advertisements or promotions or golf tips when the cart is in transition from one hole to the next.

Despite the capabilities of GPS and DGPS systems for their intended purpose, in golf course and other positioning, distance measuring, and ranging applications, such systems suffer loss of signal and, therefore, loss of communication and capability, when the roving unit moves behind an obstruction. On the golf course, this is particularly troublesome where the course is heavily treed, or quite hilly, or has on-course or adjacent buildings or other structures, or all of these types of obstructions, of sufficient dimensions to obscure or interfere with strong signal transmission. In these conditions, the golfer is inevitably faced with an "out-of-service" display screen on the cart monitor.

Co-pending U.S. patent application Ser. No. 08/690,962 titled "Robust Golf Navigation System" filed Aug. 1, 1996 in the names of J. Coffee et al. and commonly assigned with this application (hereinafter "the '962 application") discloses a dead reckoning system that overcomes these problems. The ACUTRAK™ golf course yardage and information system (ACUTRAK is a trademark of Leading Edge Technologies, Inc.), as that system is called, employs the advantages of a dead reckoning-based yardage system, with support of DGPS for calibration purposes only, and combined with the full-featured management and information capabilities of the PROLINK™ system. In the ACUTRAK™ system, the desirable attributes of a dead reckoning system are combined with limited aspects of a GPS system, through optimal estimation computer algorithms preferably using a Kalman filter, to achieve a significant synergistic improvement in performance of a golf course position, distance measurement, navigation, information, and course management system over a wide operating envelope.

The ACUTRAK™ system is golf cart-based, but could be packaged alternatively in smaller vehicles, even a set of golf bag wheels equipped with a mobile unit or a hand-held unit used with a pedometer version of the wheel-tracking system disclosed in the 0.007 application. That system utilizes virtually all of the features of the PROLINK™ system disclosed in the co-pending '295 and '905 applications, except for the ACUTRAK™ system's limited reliance on DGPS, as a calibration technique only. In addition, the ACUTRAK™ system has a unique guidance system in the form of a dead reckoning system that tracks the distance moved by and the orientation of the wheels, extrapolated to the heading or bearing of the golf cart (or other roving unit) in which a portion of the overall system is incorporated. The ACUTRAK™ system is unaffected by even frequent inability to view a satellite navigation system, such as the GPS satellites, requiring only relatively infrequent calibration during play to avoid a gradual increase or buildup of error in measurements as the cart is driven about the course. Thus, instead of experiencing frequent out-of-service indications on the cart monitor, the golfer is cognizant only of continuous, reliable operation of the ACUTRAK™ system.

A significant percentage of golf courses in the United States and elsewhere, notably Japan, employ a "cart path only" rule which requires that the golf cart (whose use is mandatory for play of the course) be restricted to cart paths, and that it not be driven on the fairway. Even for many courses where the "cart path only" rule is not in effect at all times, it is a requirement in limited instances where the course "manicure" may be affected by allowing carts to be driven on the fairway, such as where inclement weather is being experienced, or the course is wet from recent rain or even following sprinkler usage, such that the carts could produce ruts and adversely affect play of the course by biasing the roll of the ball. Moreover, even those courses which do not normally impose a cart path only rule because the paved cart paths themselves are limited to either end of the hole, i.e., at the tee box area and the green area, still preclude driving the cart directly onto the grass or terrain in either of those areas, that is, off the paved path. Where the cart path only rule is not uniformly imposed, it may be invoked from time to time on a daily basis by the course administrator who is generally the club's professional golfer and instructor, dubbed the "club pro", working from the clubhouse at which the course monitoring equipment for the PROLINK™ or ACUTRAK™ systems would be located.

It is a principal object of the present invention to take advantage of restrictions imposed on cart usage on a golf course to a cart path only rule, even in those limited situations where the rule applies only at the start and end of play of each hole, or even only in the vicinity of prescribed locations on each hole such as the green, to provide the cart navigation system, whether solely dead reckoning or combined with another navigational capability such as GPS, with a novel technique for intermittent calibration to eliminate or reduce position and measurement error buildup in the cart navigation system during play of the course.

SUMMARY OF THE INVENTION

The present invention employs a technique of map-matching for purposes of calibration of the cart-based navigation and yardage measurement system used on the golf course for reasons set forth above. The invention is not limited to use with such systems that employ dead reckoning, but the preferred embodiment is used in a dead reckoning system such as the ACUTRAK™ system described in the aforementioned '962 application. To avoid needless repetition, the specification of the '962 application is incorporated herein in its entirety, although for the sake of reader convenience, portions of that specification may be repeated in the detailed description of the preferred embodiment of the invention herein.

Briefly, the invention uses a course map which includes the cart path that is stored in the database for the cart navigation, position and yardage measurement system (sometimes referred to herein in brief as the cart navigation system). In the preferred embodiment of the invention, the position output from the dead reckoning system is taken to determine whether the cart is indicated by that information to be on the path or off the path. If the cart is indicated to be off the path and the course rule is cart path only, it can be assumed that the indication of the cart's position from the appropriate output within the dead reckoning system is in error relative to the actual position of the cart. The invention corrects that error by moving the indicated position of the cart to what is determined to be its actual real time position on the cart path by means of a map-matching method that involves conducting a limited high speed search and comparison of cart position and heading vis-a-vis cart path segment location and direction, at various points or intervals during play of the course, as a method of intermittently calibrating the cart navigation system.

As noted above, the invention can provide the needed intermittent calibration even where the cart path only rule is applicable temporarily such as where the course surface is wet, or at specified portions of the cart path such at one or both ends of the hole (e.g., at least to preclude driving the cart onto the green).

In the preferred method, initially search zones are established as substantially rectangular overlays of successive, generally straight sections (i.e., having relatively straight sequences of path segments) of a portion of the cart path of interest (such as an individual hole of the course) on the stored map of the cart navigation system. These individual zones are used in a coarse search to determine the general location or position of the cart in real time as play of the course is proceeding. The side boundary of each zone which is overlaid to be generally parallel to the respective section of the path encompassed by it is set to form limits according to desired selectivity of an "on path or off path" determination for the cart in the navigation system logic. Then, if the cart position as indicated by the navigation system is outside the boundary limits, it is assumed to be off the path. A zone having an area that encompasses the cart's indicated position in the navigation system is designated for conducting a fine search, to avoid a need to search all such zones that might be established for the entire course, and to search the resulting multiplicity of individual segments of the cart path, to find the segment on which the cart is most likely to be positioned in real time. The fine search is performed on each segment of the path after a zone is identified as "most likely."

In the fine search, the method steps performed in the navigation system preferably begin with a comparison between the heading of the cart (i.e., direction of travel of the cart) and the direction of the path segment (successively, for each segment of the path within the zone), within a predetermined coordinate system (such as Cartesian coordinate system) of the stored course map. For this reason, each individual path segment is selected so that it is restricted to a substantially single direction or orientation (again, relative to the coordinate system and direction of travel of the cart). Then, the distance between the indicated position of the cart and the designated segment (i.e., the segment under consideration) is determined by the navigation system with reference to the stored map. Next, "weights" are assigned the cart-path segment heading difference and the cart-to-segment distance, as just determined, for each path segment within the zone (a so-called "cost" analysis or "cost" calculation) to indicate which is the lowest for purposes of evaluation of which path segment of the zone is most likely to be the one on which the cart is positioned. Finally, a check of the boundary of each segment is performed to determine whether the cart is within the endpoints of the "most likely" segment. Thereafter, a position measurement computation and position update are made, and navigation solution thus obtained is displayed on the monitor in the cart.

In a sightly different method, the search may be performed without initially establishing zones overlying sections of the cart path on the stored map, first by looking forward and backward along those segments of the path in the vicinity of the cart's location. The cart path segment whose vector direction most closely matches the heading of the cart and is closest to the indicated position of the cart from the cart navigation system, and in all events within a predetermined distance from the cart (selected as being a reasonable distance based on likely maximum cumulative error of the cart navigation system since the last calibration point), and within whose endpoints the cart's position lies, is determined to be the correct segment of the cart path on which the cart is actually positioned, and the error relative to indicated position of the cart is corrected accordingly.

In this alternative, the navigation system goes through steps of testing cart path segments for direction within a limit about the cart heading determined by uncertainty about such things as compass errors and map errors, and, if a match is found, verifying that the cart location is within the boundaries of imaginary lines normal to the end points of the selected segment of the cart path. If multiple segments of the path appear to match, the closest segment to the cart's indicated position is assumed to be the segment on which the cart is positioned, and the error is corrected accordingly. If no match is found for a larger zone being examined, or if it is determined that the cart has not been on a cart path recently (e.g., because the driver has disregarded the cart path only rule, and is or has been driving somewhere on the fairway off the cart path), the search may be expanded to additional zones along the cart path.

A feature of the invention is that the map-matching method of system calibration may be implemented automatically to replace a default calibration system whenever the cart path only rule is invoked by the course administrator. To that end, the cart-based system would respond to the course administrator's broadcasting of the rule on the cart radio network as the rule of the day on the course, to shift from the default method of calibration to the map-matching method. For example, the default method could be DGPS-based, so that the navigation system is ordinarily calibrated by DGPS (such as in the ACUTRAK™ navigation system), except when the cart path only rule is invoked.

By correcting the error between the navigation system indicated position and actual real time position of the cart, the calibration system serves to correct errors in the yardage measurement between the cart and the cup or other feature of the hole which is of interest. In this way, any gradual buildup of error in the cart navigation system owing to component error such as may be attributable to the wheel sensor(s) or the compass sensor, is prevented from exceeding a predetermined limit (e.g., two yards over a cart travel distance of 500 yards, which is approximately the maximum yardage likely for any hole on the course).

In a more distinct alternative embodiment or method, the calibration is performed by a map correlation approach in which the trajectory of the cart is recorded and compared to the cart path map database to locate a sequence of path segments having a trajectory (i.e., a pathway viewed in the direction of travel of the cart) most closely corresponding to that of the cart. To that end, information is stored indicative of the travel of the cart over a relatively short time interval suitable for the comparison, by which to correlate the cart travel relative to the meanderings of the cart path on the map, and is then discarded once a match (or absence of a match) is found. Then, upon finding the matching trajectory, the indicated position of the golf cart is corrected accordingly, whereby to calibrate and update the dead reckoning navigation system according to the corrected position of the golf cart and the correlation between cart navigation system and the cart path map.

BRIEF DESCRIPTION OF THE DRAWINGS

The above and still further objects, features, aspects and attendant advantages of the present invention will become apparent from a consideration of the following detailed description of the best mode presently contemplated for practicing the invention, with reference to certain preferred embodiments and methods, in conjunction with the accompanying drawings, in which.

DETAILED DESCRIPTION OF THE BEST MODE

Figure 1A:
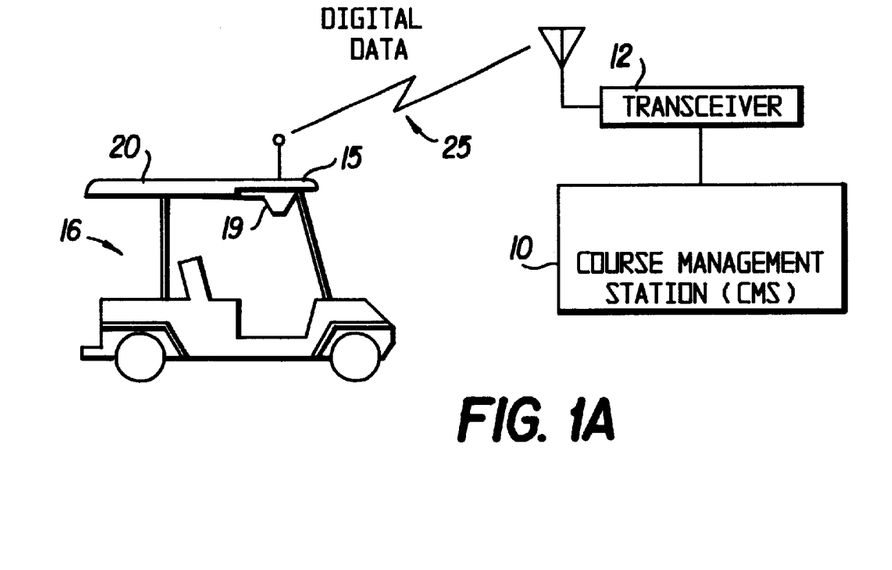
FIGS. 1A and 1B are, respectively, a simplified diagram of a portion of the ACUTRAK™ system showing the base station and a golf cart-based unit for use on a golf course, and a block diagram of the principal electronic components of a cart-based unit of the system.

The base station and cart-based units are similar to those described in the '962 application, to which the reader is referred, so a detailed description of them need not be presented here. Referring to FIG. 1A, the system includes a base station comprising course management station (CMS) 10 which includes a video display monitor 11 and is conveniently located in the pro shop for ease of real time monitoring of course play by the club pro (course administrator). Station 10 includes a course management computer with central processing unit (CPU) and video monitor, together with software for execution by the computer. The CMS monitor 11 (FIG. 2) displays the course map (or any selected portion thereof) with all its features, and indicates the locations of the golf carts (shown in FIG. 2 as numbered units in rectangular outline) and any other roving units on the course, updated in real time as they move about the course. A transceiver 12 provides two-way radio frequency (RF) communication on network 25 between the base station and the multiplicity of cart-based mobile units 16 which in this case are the golf carts used on the course. The CMS 10 provides overall timing and master control of the cart navigation system communications network.

Each cart has a display monitor 19 to provide the display of the hole being played (or other selection such as the entire course or detailed portion of the hole). When called for by the user by use of a cursor on the display, distances may be called up on the display, including those which are fixed in the survey data such as from tee to cup (as used herein, the terms "cup", "pin", and "flag" refer to the same point on the hole), and distances which change with position of the cart on the hole such as cart to cup and to any of various hazards on that hole.

Figure 1B:
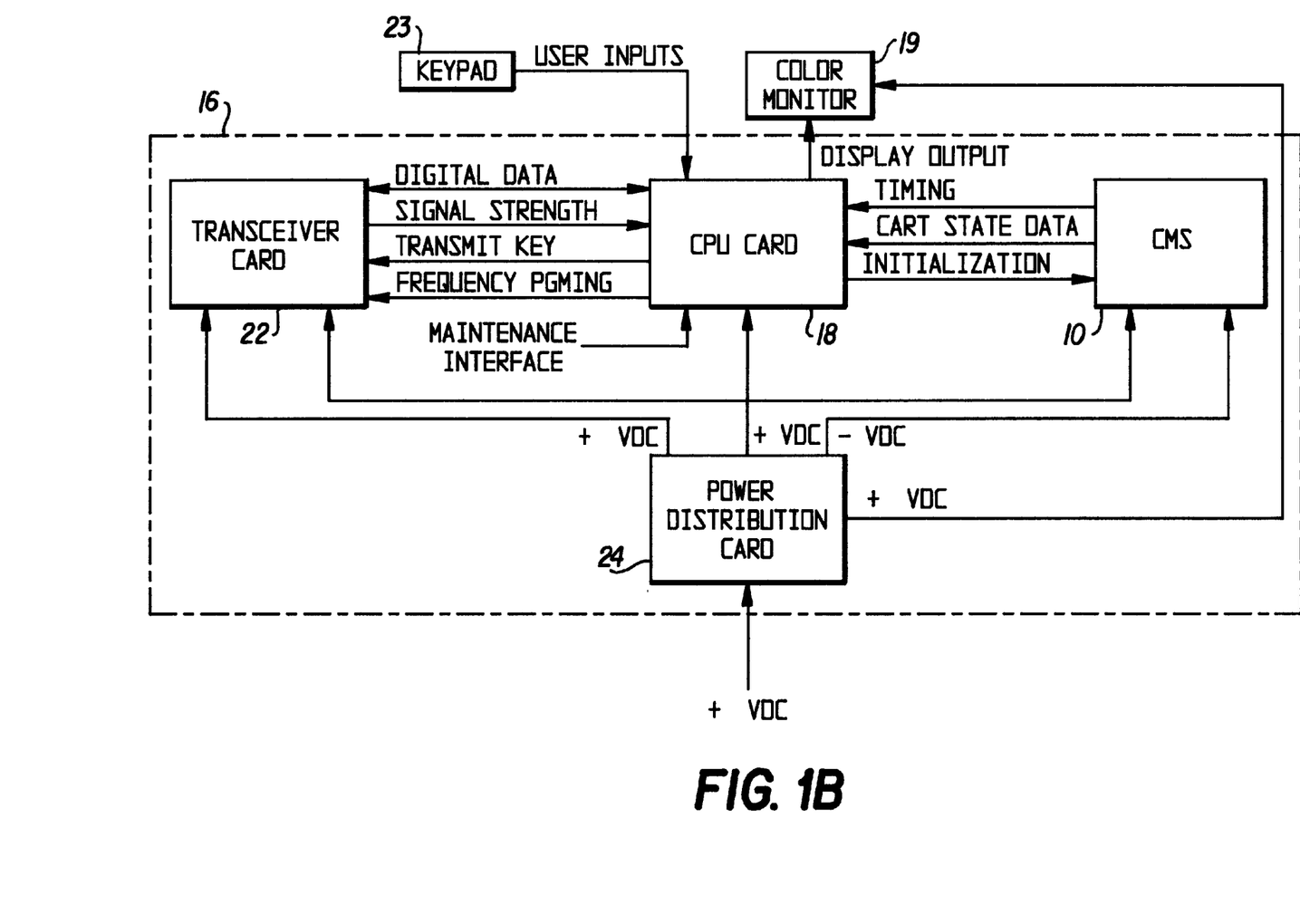

In FIG. 1B, the cart-based unit (CBU) 15 includes RF digital data transmitter/receiver (transceiver) card 22, and power distribution card 24. Monitor 19, mounted at the underside of the roof 20 of cart 16, and associated keypad 23 in CBU 15 allow the cart user to select various ACU-TRAK™ user options. Each of the carts has the dead reckoning capability of the ACUTRAK™ system, but may or may not have a DGPS calibration capability. If the DGPS capability is available, it is the preferred default calibration system for the cart dead reckoning navigation (DRN) system. But the point of emphasis is that no other calibration system or method need be used beyond that provided by the present invention which will be described below.

The relative positions and distances between fixed course features, such as between tee boxes and cups, or other fixed points and hazards, as well as hole layout, are known surveyed points or boundaries for each hole stored in the computer which can be selectively called up for display at any time on the cart monitor. If desired, the survey is conveniently performed by simply driving a suitably equipped golf cart around the perimeter of the hole and the features desired to be surveyed, as described in the '295 and '905 applications, which are incorporated herein at least to that extent, by reference. This database information is supplied by CMS 10 to each CBU 15. Also, network control data from CMS 10 provides timing and other information for the base station/cart communications. The variable length communications network of the cart navigation system allows all of the CBU's for the course to be supported by the system. Precise system timing may be provided to CMS 10 by a pulse per second (PPS) signal implemented as an interrupt to the CMS computer, for system timing to near microsecond (ms) levels to precisely control RF communication via the CMS. Also, CMS 10 transmits information to all CBU's 15, and data received from the carts at the CMS is conditioned for processing and response.

Figure 2:
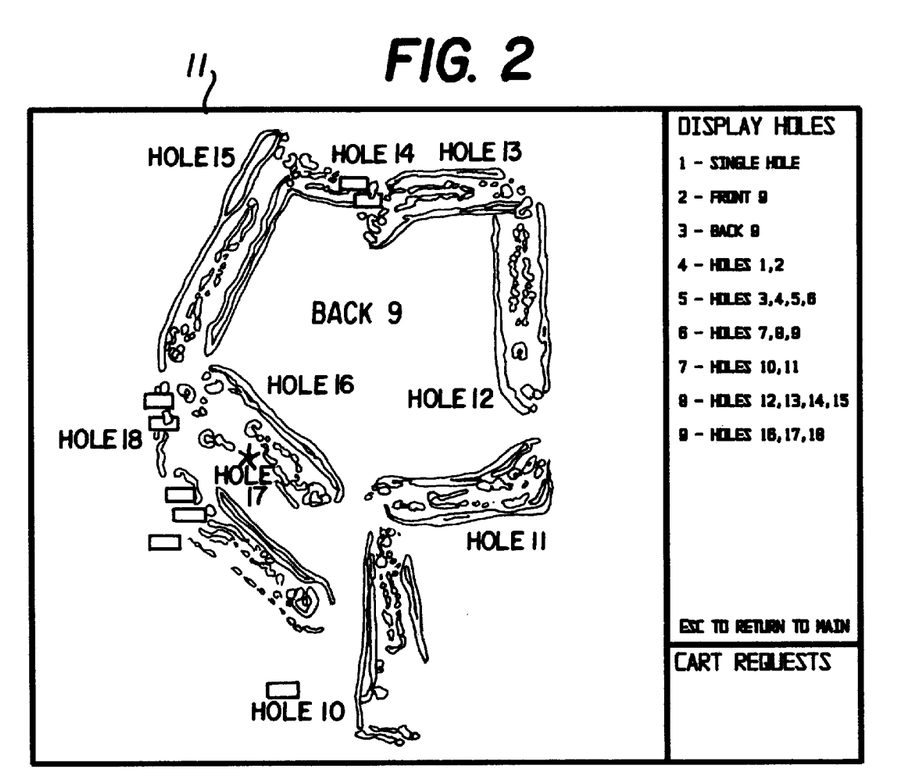
FIG. 2 is a graphical user interface windows display on the base station or course management station (CMS) monitor.

FIG. 2 illustrates a typical display on CMS monitor 11, with main window including layout of the entire course or selected group of holes, showing specific location of each cart on the course by an icon such as the cart number 102 in a rectangular outline. The CMS computer correlates cart location and the particular hole from the survey data. The right side of the FIG. 2 image shows a menu of options for the administrator including a change of the holes being displayed, or sending a message to a cart, or receipt of a message (lower right corner).

The modified ACUTRAK™ system of the present invention provides the same various improvements over the golf navigation systems described in the '295 and '905 applications, including the use of dead reckoning (DR) navigation to ascertain yardage measurements from the DR-equipped golf carts on the course to various course features of interest, including the cup and hazards pertaining to each hole being played, and with periodic calibration of cart position for removal of error by use of a map matching technique which will be described presently, as an alternative to, or as an adjunct to, the use of DGPS for calibration as in the system of the '962 application. Many features of the previous PROLINK™ and ACUTRAK™ systems pertaining to communications between base station and carts or between the carts themselves, display considerations including location of apparatus such as monitor and keyboard on the cart, course mapping, course management and administration capabilities, and so forth, are retained at least in significant part, in the system that utilizes the present invention.

The terminology "dead reckoning navigation system" is commonly defined in the navigation arts as a navigation system which, upon being initialized with the starting position, velocity, and sometimes attitude of the host vehicle, keeps track in the change in motion of the vehicle from the initial starting state. The dead reckoning navigation device used on the golf cart includes a wheel rotation sensor to measure the number of rotations of the wheel since initialization to determine the distance traveled from the initialized starting point; and since distance is merely scalar, an inexpensive compass sensor to detect the direction(s) of travel for each segment of the distance traveled, to determine magnetic heading, all as described in the '962 application. A limitation of dead reckoning systems is the existence of sources of error which allow errors to grow, albeit gradually, as the vehicle is driven over the terrain.

Where a wheel sensor is used for measuring distance, and a compass for measuring bearing or heading, errors include wheel scale factor (SF), magnetic heading variation error, sensor noise, and wheel spin, apart from any potential compass-based errors. For example, if tire pressure allows the wheel diameter to vary, then the distance traveled as measured by the system will be in error proportional to the error in the tire diameter. Therefore a method to estimate the errors and apply corrections is required for reasonable yardage accuracy to be achieved with the dead reckoning system.

The present invention uses a map-matching system to calibrate the errors in the dead reckoning navigation system. In the map-matching system, calibration of the dead reckoning navigation system may be performed at least intermittently (if not periodically for each hole) when the cart is on (or very near) the cart path so that errors such as those mentioned above in the dead reckoning system are not allowed to build up indefinitely, or beyond a predetermined permissible limit.

Various dead reckoning implementations are disclosed in the '962 application (and will not be repeated in any detail here), including the use of a single front wheel sensor to measure distance and a floated sensor compass for measuring direction, and alternatives such as dual front wheel sensors detecting the wheel rotation for measuring distance, and measuring the difference between the wheel rotations for determining the angular rate; or a fixed sensor compass for detecting direction, a terrain database for slope locations, and a single front wheel sensor for measuring distance.

Figure 3:
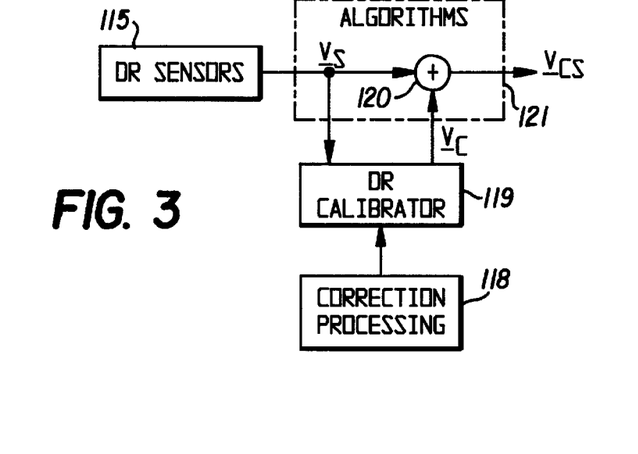
FIG. 3 is a block diagram of a generalized dead reckoning navigation system using map-matching calibration.

Reference is now made to FIG. 3 which is a block diagram for a generalized dead reckoning navigator using map-matching calibration. Dead reckoning sensors 115 provide a golf cart state vector, which will be corrupted by errors that tend to grow with time and/or distance. A map of the cart path of the course is stored in the data base of each individual cart, either separately or as part of the overall map of the course obtained from the original course survey.

Dead reckoning (DR) calibrator 119 compares the DR navigation data in the form of state vector $\underline{V}_S$ from sensors 115 to the map-matching system corrections obtained from processor 118 to compute DR calibration corrections. The latter corrections are then added in the form of a corrected vector $\underline{V}_C$ to the DR navigation solution at 120 within algorithm section 121 to provide an accurate, corrected golf cart state vector $\underline{V}_{CS}$.

The DR system is the golf cart navigator for determining distance (yardage) measurements as well as heading, but the map-matching information is used to calibrate the DR errors in real time so that each cart is intennittently (or periodically) calibrated and re-calibrated to survey points during play. After a calibration, accumulated DR errors will have been reduced substantially, thereby allowing continued high accuracy navigation for some period of time thereafter during play of the course until, with protracted travel of the cart, the combined component-induced errors approach the predetermined tolerance limit. It is desirable that the calibration be repeated within a cart travel distance of about 500 yards from the last calibration.

Once the DR system is calibrated or re-calibrated, the wheel scale factor (SF) and compass misalignment errors are brought to a manageable small size, within a predetermined limit. However, they cannot be completely eliminated, because of outdoor temperature changes, cart tires heating up, and tilt effects on the compass, and therefore, after calibration, the DR errors will begin to grow again, but only from a much more recent time of the last calibration rather than from the initiation of play, for each cart. A single calibration would be effective to maintain accuracy of within approximately two yards on distance measurements for the yardage traversed on about a par 5 golf hole, typically a distance of about 500 yards. This would not be a problem because at some point on every fairway from tee box to green at least some portion of a cart path is available and is required to be used, so that calibration can be performed, and it is performed automatically. These corrections and calibrations are made at each individual cart, as sources of DRN error may vary from cart to cart.

In the system of FIG. 3, the DR calibrator compares the DR navigation solution to the map-matched data and corrects the errors in the DR solution, to provide an accurately calibrated DR navigation system. The essence of the correction and calibration technique is the formulation of a correction gain computation and the number of DR sensor errors to be calibrated. The preferred approach here, as it was in the case of the systems disclosed in the '295, '905, and 962 applications, is to use a Kalman filter (KF).

The Kalman filter provides a mathematical formulation to optimally correct (i.e., calibrate) a system with time varying error dynamics such as a DR navigation system, based on the error characteristics of each sensor, sensor errors, and DR navigation errors. The KF estimates the optimum result from numerous inputs that are corrupted by noise. In Kalman filtering, it is common to estimate the error in a state, rather than the state itself. For example, a Kalman filter is used to estimate the error in the wheel scale factor as opposed to estimating the wheel scale factor itself. The KF implementation used in conjunction with the present invention performs error state propagation instead. The general KF formulation for error state propagation is described in detail in the co-pending '962 application.

In the DR navigation system calibration, when a map-matching measurement is made, a gain is computed and the error state and error state covariance are updated. The change in the error state is applied to the appropriate DR navigation algorithm state variables to correct the solution and calibrate the sensor errors. The KF implementation will be described further below.

In an embodiment of the ACUTRAK™ system described in the '962 application, a floated sensor compass and a single front wheel sensor are used for the DR navigation system of the cart, which provides accurate cart position determination under a wide range of operating conditions that can be expected on a golf course, and assures accurate yardage calculations of range from the cart to the cup or to various hazards on the hole (or to anything on the entire course which has been included in the survey or whose position is determined); as well as accurate information on location of each system-equipped cart on the course to assist course management in efficient operation of the course. When the cart is confined to the cart path it cannot generally be positioned close to the ball, especially where a golfer's skills of the game are less likely to allow good placement on each shot. (A system described in a co-pending application of Brad Garn titled "Remote Ball Locator" (Attorney's Docket No. 1304.015), assigned to the same assignee as the present application, nevertheless can provide accurate distance measurements from the ball itself even when the cart must be confined to the cart path only).

An acceleration compensation algorithm ("compass tilt estimation" algorithm, also described in the '962 application) is used for the floated compass. It is desirable for wheel rotation resolution to be at least 64 counts per wheel revolution, i.e., to detect at least every 5.625 degrees of revolution. In the floated compass, the sensor is floated in a liquid bath and uses the Earth's gravity to keep the sensor level with respect to the gravity field, thereby resulting in the compass sensor remaining fixed with respect to the earth's magnetic field. Such a compass enables accurate measurement of magnetic heading even when the golf cart is tilted on a hill.

However, a floated compass is responsive to acceleration of the golf cart (e.g., starting, braking, or turning) such that the sensor is artificially tilted throughout an acceleration event, and such event produces a loss of accuracy in measurements performed by the system. Compensation for compass errors during an acceleration event is achieved by virtue of (I) the high resolution wheel sensing to at least 64 counts per revolution, and (ii) the acceleration compensation algorithm which is run in the navigation computer and responsive to observation of such an event, developed to predict the effect of the induced tilt on the compass heading output.

A compass tilt estimate or prediction of the effect of acceleration on a floated compass sensor to induce tilt, and its effect on the compass heading output, is calculated from data obtained from the compass and the wheel sensor, and this estimate is then used to compensate for tilt errors. A floated compass/front wheel sensor ACUTRAK™ system is shown in block diagrammatic form in FIG. 4 (corresponding to a Figure of the '962 application which is reproduced here with at least a part of the accompanying text for the sake of convenience to the reader). The DR sensors in this system are floated magnetic compass 133 and front wheel encoder 134. The outputs of both sensors ($\psi_m$ for compass 133 and a pulse stream indicative of wheel speed for encoder 134) are delivered to DR navigation algorithms section 135 following initial processing. Output $\psi_m$ is subjected to low pass filtering at 136, and the filtered information derived from the compass sensor output is applied, together with a factor $\hat{\omega}_m$ involving rate of change of heading derived at 137 from the filtered output (which is added) and from a factor which is an inverse of the residual measurement ($Z^{-1}$, which is subtracted), a factor $\beta_i$ representing the Earth's magnetic inclination, and inputs derived in similar fashion from the processed output of wheel sensor encoder 134, relating to wheel speed $\hat{V}^w$ and wheel acceleration $\hat{\alpha}$, to develop a compass tilt estimate or prediction correction factor $\Delta\psi$ at 138. This compass tilt estimate correction factor is then applied at 139 to the processed output from the compass sensor 133 to compensate for tilt error.

Figure 4:
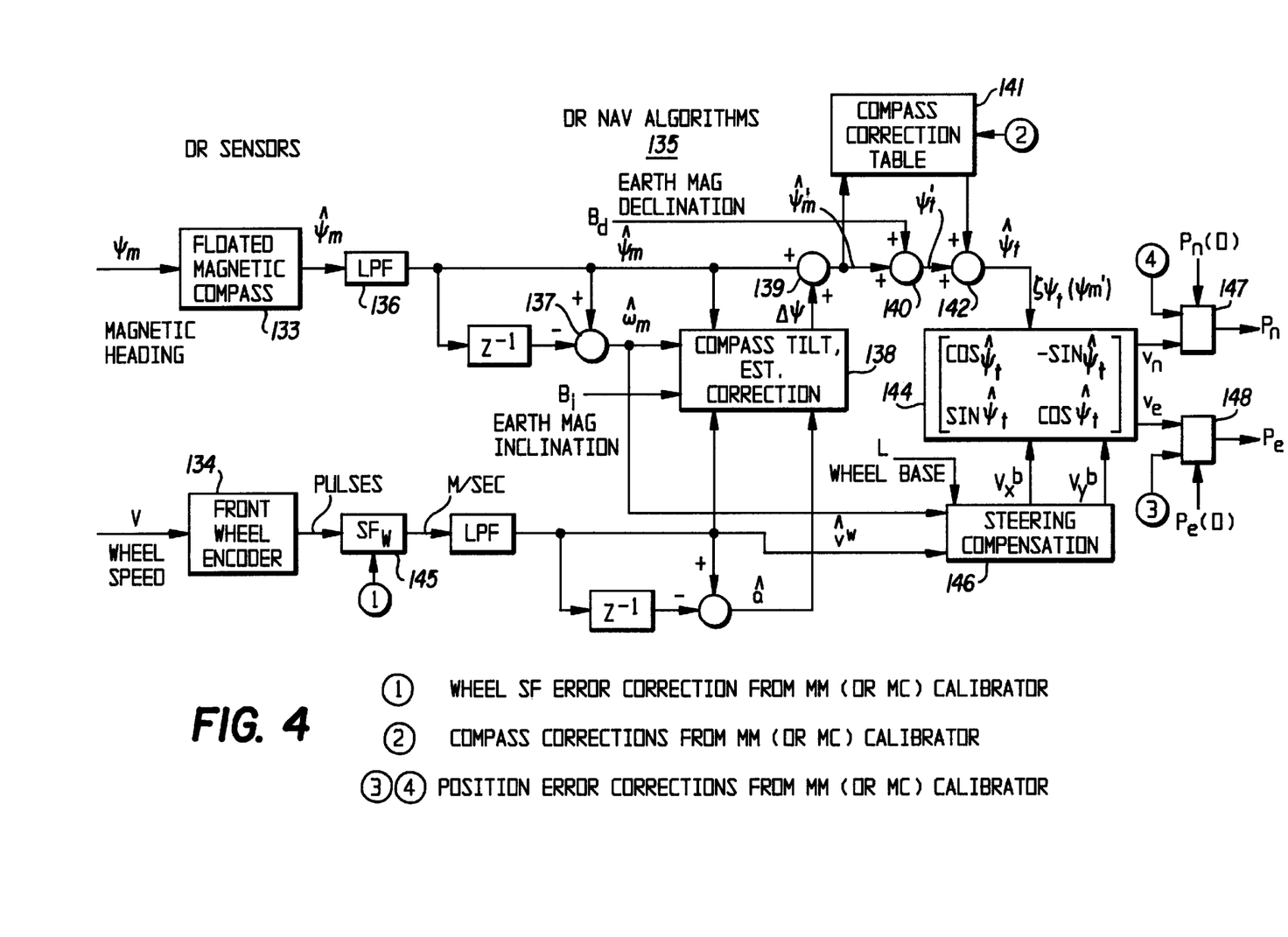
FIG. 4 is a block diagram of a navigation system using a floated compass/front wheel sensor DR system implementation.

The resulting data is applied to a compass correction table at 141 and is also added to a factor $\beta_d$ representing the Earth's magnetic declination at 140. The compass correction table (a lookup table) also receives as an input the compass corrections from the DR calibrator 119 (FIG. 3). A table 141 correction is added to the output of 140 at 142 and the result is applied to a table calculator 144 along with information derived from the wheel sensor encoder output processing path.

The output of encoder 134 is subjected to application of a wheel scale factor error correction $Sf_w$ from DR calibrator 119 at 145, reflecting compensation of an error that increases with distance traveled over time. The resulting output undergoes processing similar to that provided in the compass sensor path, as described above, so that the pair of outputs related to wheel speed and acceleration are obtained and applied to develop the compass tilt estimation at 138, while the wheel speed factor is also applied to provide steering compensation at 146. Also applied to the latter are the turn rate (rate of change of heading) factor $\hat{\omega}_m$ and a factor representing the wheel base of the cart, from which speed (velocity) compensation factors $V_x$ and $V_y$ are derived for application to table calculator 144.

The north and east wheel speed outputs of 144 are integrated at 147, 148 with position error correction factors from the DR calibrator, and referenced to initial north and east positions $P_n$ (0) and $P_e$ (0) of the cart, to generate corrected north and east position information $P_n$ and $P_e$, respectively. By virtue of the foregoing algorithm, tilt errors from the floated compass arising from acceleration in a golf cart equipped with a floated compass/front wheel sensor DR system are compensated for with each calibration of the cart-based system. The meanings attached to the symbols shown in FIG. 4 and related calculations or computations are detailed in the '962 application and need not be repeated here.

Previously described golf cart navigation systems (including the '295, '905 and '962 applications) have been based on data from GPS alone, dead reckoning alone, various methods of radio triangulation, and dead reckoning aided with GPS. According to the present invention, map-matching is utilized as an additional navigational aid for golf carts, where the indicated position of the cart is compared to a cart path map stored in the navigational system database. Differences between the indicated position and the expected position from the map database are used to calibrate the cart navigation system.

Most golf courses that use golf carts have paved or at least well-defined cart paths. Golfers confine the carts to the path most of the time, especially when the "cart path only" rule is in effect. Many course administrators (courses in Japan, for example) require that carts be driven on the paths at all times. Stored maps of the cart path in the navigation computer can then be used to update and calibrate a dead reckoning (DR) or a combined DR/GPS navigation system. Calibration and updating serve to correct position error introduced by wheel sensors and compass in the DR system, for example, with distance from the last calibration, by eliminating or at least reducing navigation drift that indicates the cart to be off the cart path and thus erroneously affects distance measurements in the system when the update determines that the cart is actually on the path.

The presently preferred map matching algorithm for this purpose employs path segment search and detection algorithms and mode logic to allow its use for calibration on all golf courses with cart paths, whether or not the course restricts carts to the cart path only. If the cart is driven off the path, the system will detect that and no longer update the navigation system. The system has the capability to provide navigation output data which maintains the depiction of the cart on the path at all times, despite slight navigation error which would otherwise indicate that it is off the path.

As was briefly observed above, the map-matching method calls for the use of a known map of the cart path of the golf course in connection with a cart-based DR system such as the ACUTRAK™ system, to enable calibration without resort to any DGPS information or to assist a combined DR/GPS system when GPS data is simply unavailable because satellite "viewing" is obscured, such as on heavily treed courses, or as the preferred method when the cart is determined to be on the cart path. Corrections are made in the system of the invention using a filter that accepts cart path map-matching inputs. With a map of the cart path for the course stored in the cart navigation system database, the location and direction of the cart path at each point along the course are known, and the indicated position output from the DR system can be used to determine whether the cart is indicated to be on the path or off the path. If the cart is off the path and the course rule is cart path only, the map-matching technique of the invention will serve to correct the position of the cart on the screen and the related measurement of its distance from a feature of interest, such as the cup or a hazard on the hole being played. If the cart is actually on the path but the position of its icon on the display screen is off the path and in relatively close proximity, it is a reasonable assumption that this is attributable to errors introduced by the DR navigation system.

On a golf course cart path, one would not normally encounter long straight sections of the path followed by right angle turns, which typically characterize city streets. Such 90° or 180° changes in direction make errors in the DR system much more readily visible for use of calibration and updates to correct the errors. Golf course cart paths, however, tend to be more smooth and windy in their direction changes, having what in many instances may be characterized as a "meandering" pathway. This tends to increase the complexity of using solely map-matching for correcting errors to improve navigation system performance. Additionally, if the course rule is not cart path only, or the golfer ignores the rule, or the cart path exists only in the vicinity of the tee boxes and the green on each hole, then the map-matching technique is made more difficult.

One significant problem is to determine the section of the cart path that the cart should be on at any given point in the play of the course. Assuming it has been determined that the cart should be somewhere on the path, segments of that section of the path where the cart should be located are examined to find a segment that most closely matches the location and heading of the cart as indicated by the navigation system used by the cart. That is, if the cart is moving, and is supposed to be on the path, a segment of the path in the vicinity of the cart must exist having a direction that closely matches the direction of travel of the cart.

If multiple segments of the cart path closely match that direction of travel, it is then necessary to find the specific segment of the path which is closest to the cart, on the assumption that this is the segment on which the cart is actually located. If it happens that the cart is too far away from any appropriate segment of the cart path, then the assumption is that the cart is either not on the section of cart path being searched, or is not on the cart path at all. In that event, it is necessary to expand the cart path search.

A viable map-matching algorithm demands an efficient method of searching the cart path database for the most likely segment of path on which the cart is located. A preferred approach of the invention is to establish a plurality of zones that define areas of the map which contain sequences of path nodes (segments). Confining the search to the zone (or overlapping zones) in which the cart is located reduces the number of segments of cart path to be searched. The segments of the path located in the identified zone are then searched to find the best match between position and heading of the cart on the one hand and location and direction of a path segment on the other. The best match produces a path segment of the map database which is processed to determine the correct point on the cart path to be used for an update of position in the navigation system.

As a first step, a coarse path segment location is determined by use of rectangular zones such as zones 1 through 5 (201, 202, 203, 204, etc., in FIG. 5) placed around relatively straight sequences of path segments. The zones may be established on the display of the cart path map in the manner disclosed for zone development described in the '295 an '905 applications. For example, each rectangular zone shape may be defined on the hole map (which includes the cart path for that hole) on an x-y Cartesian coordinate grid by its center, semi-major and semi-minor axes, and rotation angle of the semi-major axis with respect to the survey grid axes. With the specific coordinates of a golf cart (x,y), as determined by the cart's DNR system may readily calculate whether the indicated position of the golf cart is inside a particular rectangular zone.

Figure 5:
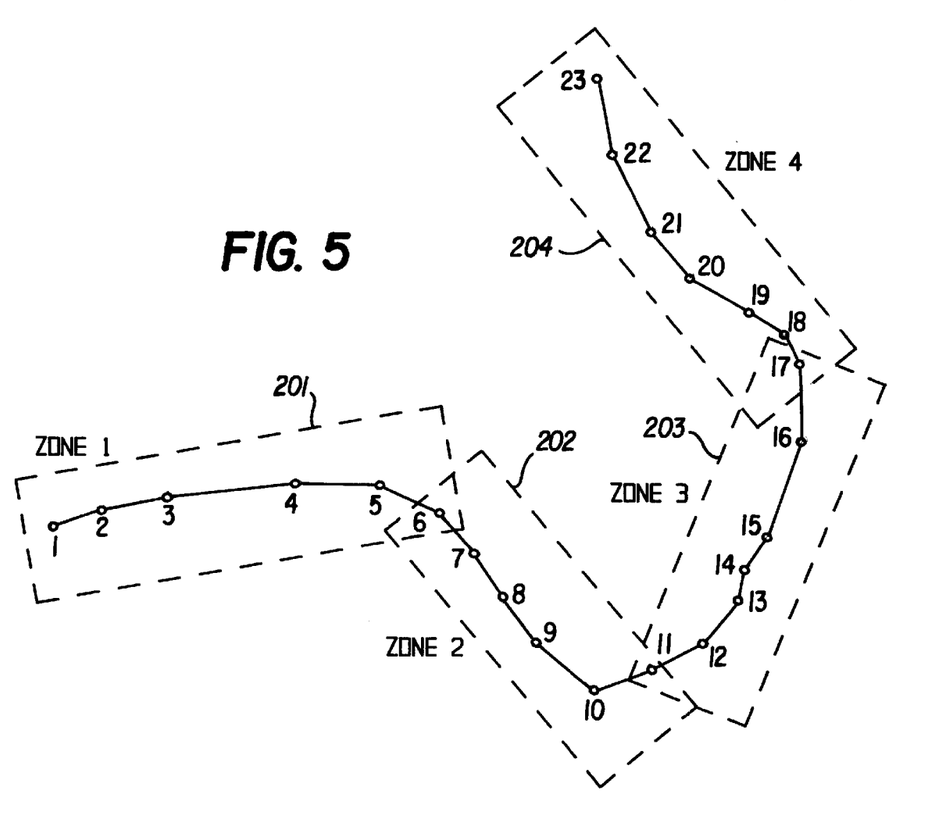
FIG. 5 is a simplified line diagram of a multiple sections of the cart path with overlay of a plurality of rectangular zones, each zone lying along a relatively straight line sequence of segments of the path.

For purposes of the present invention, each zone is sized so that a boundary (indicated by the dash lines) is placed around the selected sequence of segments to account for navigation system drift away from the path. The nominal minimum boundary to allow for drift in the preferred embodiment is 5 yards, and the boundary is not allowed to be more than 15 yards. These limits are cited by way of example only, and may be adjusted depending on navigation system performance or on/off path selectivity desired in the mode logic. If a position identified for the vehicle is outside the boundary, the vehicle is assumed to be off the path.

In the example of FIG. 5, the zones are stored in the navigation computer with the following data:

| Zone ID | 1st Path Node | Number of Nodes |
|---------|---------------|-----------------|
| 1 | 1 | 7 |
| 2 | 7 | 6 |
| 3 | 12 | 7 |
| 4 | 18 | 6 |

The first path node is an index into the path segment database of the first segment within the zone. The number of nodes is the number of segments within the zone. The indexing allows the segment to be found efficiently.

The path segment database contains the node coordinates and pre-computed length and angle of each segment obtained from the original course survey, such as the survey performed with the golf cart itself during the mapping of the course, as described in the '295 and '905 applications. For example, in FIG. 5:

| Node | X | Y | Length | Angle |
|------|----|----|--------|-------|
| 1 | 9 | 63 | 6.7 | 27 |
| 2 | 15 | 66 | 7.2 | 16 |
| 3 | 22 | 68 | 17.2 | 10 |
| 4 | 39 | 71 | 9.0 | 0 | where the X and Y values are obtained from a Cartesian coordinate system overlay of the digitized cart path map as stored in the system memory; the length is the number of units for the unit of measure selected, such as 6.7 yards between the beginning of node 1 and the beginning of node 2; and the angle is that between the X-axis of the coordinate system and the inclination of the path on the map display.

The navigation system compares the indicated position of the cart to the area covered by each zone. Path segments in the zone are subsequently checked to determine whether the cart is on any of them. If the indicated position is not in any of the zones, it is assumed that the cart is not on the cart path.

After this coarse search is completed, a fine search is commenced. Once a cart path segment sequence is selected based on the coarse search, each segment is evaluated to determine if the cart is on that segment. In the preferred method, the fine search consists of the following sub-steps:

First, a cart path heading check is performed. If the cart heading is available from the navigation system, it can be used to verify that the cart is pointed along the path segment. If it is not pointed along the segment then it is not likely to be on the path. The cart heading and path segment heading are compared as follows:

Compute heading difference dpsi:
 dpsi=heading−segment_angle.

Unwrap the heading difference to a range between +90 and −90 degrees:
 if dpsi≧180 then dpsi=dpsi−360
 if dpsi<−180 then dpsi=dpsi+360
 if dpsi≧90 then dpsi=dpsi−180
 if dpsi<−90 then dpsi=dpsi+180

If the absolute value of dpsi is greater than a predetermined cart-segment heading difference tolerance, then the cart is assumed to be off of the path and the next segment is checked; otherwise, this segment is evaluated further.

Next, the distance from the cart to the cart path segment is checked. This distance must be sufficiently small for the cart to be considered to be on the path. If the ends of the cart path segment are at the coordinates (x1,y1) and (x2,y2) respectively, and the cart is at coordinates (xp,yp), then the distance from the to the path is calculated as follows:

dx=x2−x1
 dy=y2−y1
 dxp1=xp−x1
 dyp1=yp−y1
 dist=abs (dxp1*dy−dyp1*dx)/length where length is the pre-computed length of the path segment.

If the distance from the cart to the path is greater than a predetermined maximum distance tolerance, then the cart is assumed to be off the path and the next segment is checked; otherwise, this segment is evaluated further.

A segment "cost" functional is computed which weighs the cart-segment heading difference and the distance from cart to segment, for each path segment in the zone of interest, to determine which segment the cart is most likely to be on. The cost, J, is computed as:

$$J = Kpsi*dpsi^2 + Kdist*dist^2$$

where the gains, Kpsi and Kdist, are chosen to weigh the heading and distance errors based on expected navigation accuracy and on the importance of each parameter in selecting the correct segment.

If the cost of this segment is greater than that of a previously evaluated segment, then the next segment is checked. Otherwise, the segment is evaluated further.

Figure 6:
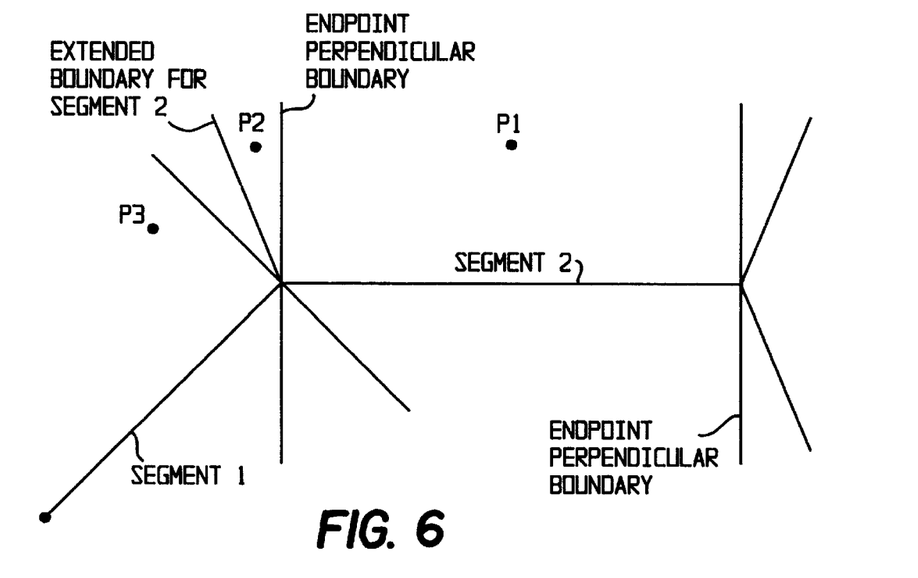
FIG. 6 is a simplified line diagram of adjacent segments with lines lying perpendicular to or at a slight angle to the endpoints of a segment to determine whether the cart lies between the endpoints.

A segment bounds check or test is the final evaluation of the path segment under consideration. Referring to FIG. 6, for the cart to be on a segment 2, it must be within the ends of that segment. In this determination, two different bounding criteria are used for the cart position P, namely: 1) that p is inside the perpendiculars to the segment endpoints (as P1 is, in the Figure), and 2) that P is inside an extended bounds region slightly beyond the segment endpoints (as P2 is, in the Figure). The extended region is used to account for the exterior of convex path intercepts where there is an area that is "on the path" but not within the perpendicular bounds of either path segment. If the cart position P is within the perpendiculars (as P1 is, for segment 2), a position update based on the intercept of a normal to the path is used. If the cart is within the extended bounds of a segment (as P2 is, for segment 2), then the nearest endpoint is used for a position update. Point P3 is outside any segment 2 boundary, but is inside the perpendicular boundary of segment 1.

If the position is within the bounds of the segment endpoint perpendiculars, the dot products between the path segment vector and the two vectors from the segment endpoints to the position point will be of opposite sign (or only one will be zero). The dot products are computed as follows:

dxp2=xp-x1 dyp2=yp-y1 dot1=dxp1*dx+dyp1*dy dot2=dxp2*dx+dyp2*dy where dot1 and dot2 are the dot products corresponding to the segment endpoints 1 and 2.

If the dot products are not of opposite sign or neither one is zero, then the point is not within the perpendicular bounds, and the extended bounds region must be checked. This is done by computing the angle between the position point and the nearest segment endpoint and the extended bounds angle limit.

The distances to each endpoint are:

dp1=sqrt(dxp1*dxp1+dyp1*dyp1)

dp2=sqrt(dxp2*dxp2+dyp2*dyp2)

If dp1 is less than dp2, then endpoint 1 is checked:

angle=acos(dot1/length/dp1)

otherwise, endpoint 2 is checked:

angle=acos(dot2/length/dp2)

If the absolute value of the angle is less than the extended bounds angle limit, then the cart position is within the extended bounds. And if the point is within either the perpendicular or extended bounds as determined from this series of computations, the cost of the point is stored.

A position measurement computation is now performed. After all candidate path segments have been evaluated, the segment with the lowest cost is used for a position update to the navigation system. If no suitable segment has been found, then the cart is determined to be off the path and no update can be made at this time. At some point in time, of course, the cart will return to the path (for example, at a location adjacent the tee boxes or the green for the hole being played), which allows a calibration and update to be performed by the map-matching technique.

The position measurement computation is performed as follows. If the position is in the extended bounds region of the segment, then the nearest endpoint is used to generate a position update to the navigation solution. For endpoint 1, the position fix (xi,yi), the measurement distance (d), and the measurement matrix [Hx,Hy], are:

xi=x1 yi=y1 d=dp1

H=[-dxp1, -dyp1,]/dp1 and for endpoint 2, they are:

xi=x2 yi=y2 d=dp2

H=[-dxp2, -dyp2]/dp2

If the point is within the perpendicular bounds of the segment, the measurement is made normal to the segment. The intercept point on the segment of the normal between the point and the segment is:

xi=((x1*y2-x2*y1)*dy+(xp*dx+yp*dy)*dx)/length^2 yi=-((x1*y2-x2*y1)*dx+(xp*dx+yp*dy)*dx)/length^2

The measurement distance and measurement matrix in this case are:

d=sqrt((xi-x)^2+(yi-y)^2

H=[xi-x,yi-y]/d.

In a position update, the dead reckoning navigation solution is updated with the position fix generated from the cart path position fix. In the preferred embodiment, the cart path position fixes are blended with a dead reckoning navigation system solution using a Kalman filter, but other, suboptimal, filtering schemes may be used. In addition, other navigation aids such as differential GPS may be used to update the DR solution simultaneously with the cart path position fixes. All aiding sources are also used to calibrate the DR sensors.

A Kalman filter used to blend dead reckoning data with position updates from a cart path map may be implemented in several different ways. One approach which is appropriate for a DR system based on a wheel rotation sensor and a magnetic compass is as follows:

The error state vector contains position (x,y), wheel scale factor (SF), and heading (psi) errors:

$x^T$=[Px Py dSF dPsi]

The state transition matrix (to 1st order) would then be:

$$A = \begin{bmatrix} 1 & 0 & Vx*dt & -Vy*dt \\ 0 & 1 & Vy*dt & Vx*dt \\ 0 & 0 & 1 & 0 \\ 0 & 0 & 0 & 1 \end{bmatrix}$$

where dt is the propagation time interval.

Uncertainty in the error state is expressed by the covariance matrix, P. Between updates, P is propagated as:

P=A*P*A$^T$+Q where Q is the process noise matrix, representing the uncertainty in the model of the error state.

When a measurement is made, an optimal gain is computed as follows:

K=P*H$^T$*(H*P*H$^T$+R)$^{-1}$ where R is the measurement noise matrix which represents the uncertainty in the accuracy of the applied measurement. The error state is corrected by the measurement using the optimal gain and the measurement residual. In the case of the cart path generated position fix, the distance to the path is the residual:

x=x+K*d and the covariance is updated as:

P=P-K*H*P

The error dynamics embedded in the Kalman filter allow the updated equations to correct for position errors and calibrate the dead reckoning sensors.

When the cart is on the cart path, the navigation solution displayed to the operator may be made to be exactly on the path even though the optimal combination of navigation data from dead reckoning and map updates (and possibly GPS, if desired) indicates the vehicle to be slightly off the path. This provides the operator with the appearance of perfect navigation when the vehicle is on the path. A drawback of this approach is that if the vehicle drives off the path, the position displayed will still be on the path until the system detects that it is off the path.

In a slightly different alternative approach, search zones are not established first, but instead the process proceeds forward and backward through a selection section of the cart path, and then tests for the direction of each segment of that section of the path to determine whether it matches the heading of the cart according to the DR system. If a matching section is found, a check is performed as to whether the cart is actually in the boundaries of the endpoints of a particular segment of that section. If the cart is outside those boundary points at either end thereof, then that segment of the cart path fails to qualify as the correct segment of the path. A list is compiled of those segments that qualify as the correct one, and that one of the listed segment is chosen which is closest to the cart. If the cart is too far away from any of the qualifying segments, based on the assumed performance of the DR system being used (e.g., if the error is, say, assumed to be only two meters from where a point is actually located, and the cart is not within 10 meters of any of the listed segments), then the assumption would be that the cart is not on any portion of the cart path.

Hence, if the cart is not found along a current section of the path as the first step of the method, then the search is expanded over a broader portion of the course to find the cart as the second step. To keep this latter search from becoming onerous—simply because hundreds of possible segments to be searched might be encountered on the golf course—a plurality of search zones are established to overlay respective sections of the portion of the cart path map of interest, e.g., for a particular hole, just as was described above for a beginning step in the preferred method of map-matching. The rectangularly-shaped search zones may, to some extent, be overlapping. If the cart were found to be located in a single zone, the search would be limited to that zone. But if the cart appears to be in an overlap region of two or more zones, then the overlap region must be searched.

It will be understood that a critical aspect of the method of the invention is to very rapidly ascertain which part of the data base must be examined for the location of the cart and for the closest match. If it were necessary that the entire data base be scanned each time, then virtually all—or at least a large part—of the system's processing power would be spent in searching for the location of the cart. Rectangular zones, however, are relatively easy to compute mathematically, and to be "pasted" over the map of the course cart path to eliminate all areas of the map except the portion of the cart path being searched in a particular zone. Accordingly, a search zone algorithm is preferred over, say, an X-Y table technique of searching for the cart location.

An alternative algorithm would be to create a database list of cart path segments based on hole number, as well as a list of holes adjacent to the initial hole of interest, the assumption being that the golfer cannot drive a long distance across the golf course in a short period of time. The system keeps track of the hole being played by each cart, so that is the first area (and list of cart path segments) of search. Then if the right cart path was not found on the first hole being searched, the search would be expanded to each adjacent hole. For this purpose each hole has a designated number and list of cart segments associated with it.

For updating the DR navigation system, the map-matching algorithm generates a position fix 225 (FIG. 7), created by determining the intersection or intercept point of a line 228 normal to the indicated position 230 of the golf cart and the cart path segment 231 that is closest to it. The position of that intersection or intercept point is a northeast coordinate which is fed into the filter update implementation, and the position difference between the indicated position of the cart and the intercept point on the cart path is the measurement residual (position residual) that is applied to the filter.

Figures 7, 9A:
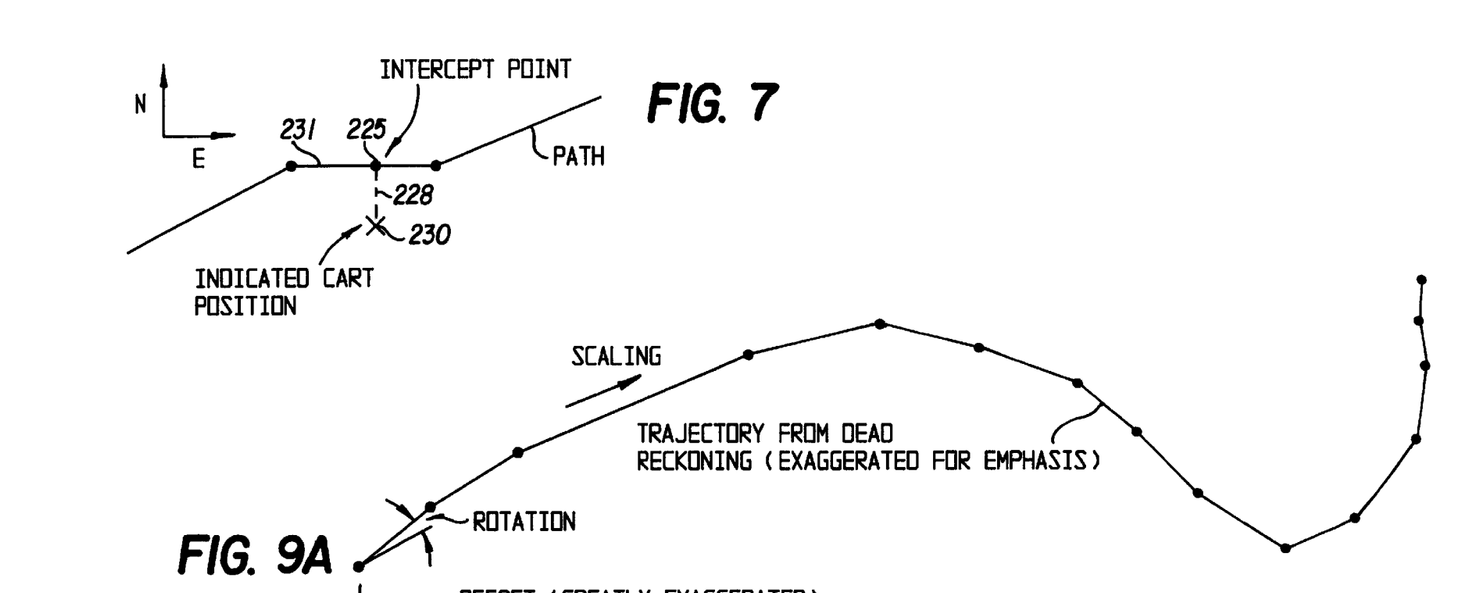
FIG. 7 is a simplified line diagram for explaining the development of a position residual or measurement residual according to a method of the invention.
FIGS. 9A and 9B are a simplified line diagram of the trajectory of the cart from the dead reckoning system, and the pathway of a sequence of segments along the cart path which is the true trajectory that closely corresponds to the DR trajectory, respectively.
Figure 8:
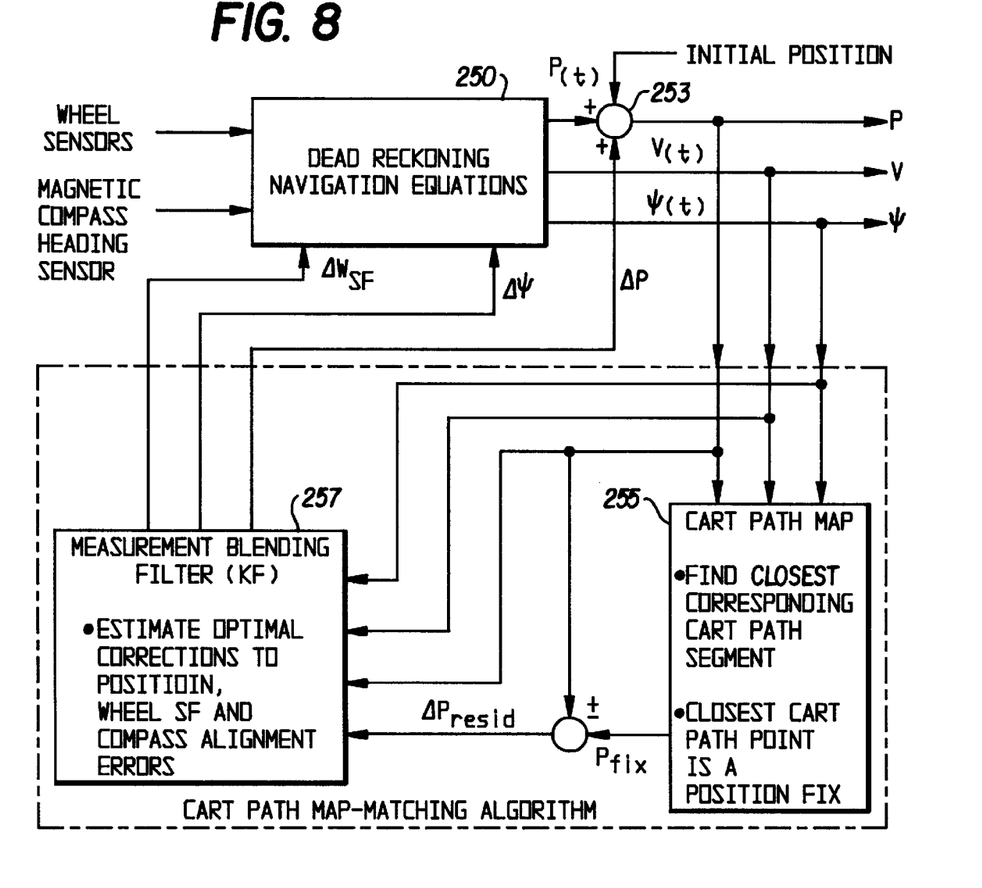
FIG. 8 is a simplified block diagram of a DRN system using cart path map-matching and a Kalman filter for error correction and system calibration.

This is shown in the cart path map-matching DRN system block diagram of FIG. 8. The wheel sensor and magnetic compass heading sensor data are supplied to the logic 250 for implementing the DR navigation equations (described in the '962 application). The outputs of the latter include cart position (P), velocity (V) and heading ($\psi$) data as a function of time. Initial (and subsequent) cart position data is calibrated (corrected) at 253. First, however, the position, velocity and heading data are fed to the cart path map logic 255 to implement the steps described above with reference to FIG. 7, which results in a position fix $P_{fix}$ for correcting the position data P at 256. The position residual data $P_{resid}$ is applied, together with the P, V and $\psi$ data, to KF 257. The latter estimates optimal corrections to position ($\Delta P$), wheel scale factor error ($\Delta w_{sf}$), and compass alignment error ($\Delta \psi$), and the $\Delta P$ is applied for calibration at 253.

The Kalman filter implementation may be substantially identical to that described in the '962 application for position fix updates to the DR system, except that a map-matching position fix is used rather than a DGPS position fix. Accordingly, a simplified description of the formulation will be presented here for the sake of convenience to the reader.

KF formulation for DR system(s) with compass and front wheel sensor:
Simplified PVT:
Modeled error states:
$\delta P_n$=north position error
$\delta P_e$=east position error
$\delta SF$=wheel SF error
$\delta \psi$=heading error (compass alignment)
Error propagation model:

$$\dot{x} = A \quad x + \omega$$

$$\frac{d}{dt}\begin{bmatrix} \delta P_n \\ \delta P_e \\ \delta SF \\ \delta \psi \end{bmatrix} = \begin{bmatrix} 0 & 0 & V_n & V_e \\ 0 & 0 & V_e & -V_n \\ 0 & 0 & 0 & 0 \\ 0 & 0 & 0 & 0 \end{bmatrix} \begin{bmatrix} \delta P_n \\ \delta P_e \\ \delta SF \\ \delta \psi \end{bmatrix} + \begin{bmatrix} 0 \\ 0 \\ \omega SF \\ \omega \psi \end{bmatrix}$$

The noise models for $\omega SF$, $\omega \psi$ would be dependent to some extent on the measured cart navigation state. For example, compass acceleration compensation may have errors associate with modeling float or pendulum dynamics under high g turns or extreme tilts outside the range of the float to compensate. For fixed compasses, the heading correction noise model may be affected, for example, by uncertainty about the terrain map accuracy. The noise models affect the value of $\theta$ for each propagation stage.

The above error model has a single heading error state for clarity of the description. For typical magnetic compasses, a more detailed error model is necessary. The DR navigation algorithms discussed in the '962 application specification have a heading correction lookup table which supports different heading corrections at different heading values.

These can be included in the filter by adjusting the heading error noise and covariance for a single error state as the vehicle heading changes or by including multiple heading error states, one for each of the several heading ranges. Measurement update:

This KF formulation supports map-matching (MM) (or map correlation, MC, see below in the description of a more distinctive alternative embodiment) position fixes (other formulations could use position and velocity)

East position:
$Z=DR_e-MM_e$
$H=[0 1 0 0]$
North position:
$Z=DR_n-MM_n$
$H=[1 0 0 0]$ For each updated measurement, K is computed based on P, H, R. The covariance P is updated and the error state X is updated.

The updated error state will typically have updated elements for most state and sensor errors, depending on the vehicle (cart) trajectory (this term includes cart heading, speed, acceleration, tilts, etc.). The error states may then be transferred to the DR navigation algorithm variables:

$$DR_n^+ = DR_n^- - X_k^+ \quad ③$$
$$DR_e^+ = DR_e^- - X_k^+ \quad ④ \quad \text{(See FIG. 4)}$$
$$SF_\omega^+ = SF_\omega^- - X_k^+ \quad ①$$
$$\delta\psi_t^+ = \delta\psi_t^- - X_k^+ \quad ②$$

$$X_k^+ = 0$$

Depending on the requirements of real-time filter implementation issues, part or none of $X_k$ would be transferred to algorithm state variables on any given update cycle.

A more distinctive alternative approach to the path map-matching approach of the preferred embodiment or method is map correlation. In this alternative, the trajectory of the vehicle is recorded and compared to the path map database to find a sequence of path segments which has a trajectory similar to that of the vehicle.

Figure 9B:
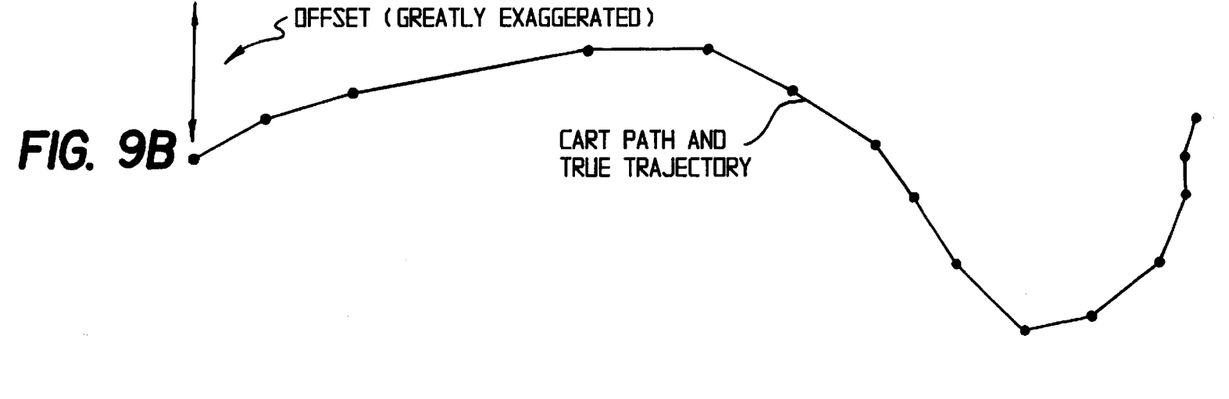

FIG. 9 illustrates how a dead reckoning navigation (DRN) trajectory may compare to a true trajectory. The DRN solution may contain an offset error, rotation (heading) error, and distance scale factor (wheel scale factor) error. Map correlation requires comparing the DR trajectory to a sequence of cart path segments so as to find the most closely matching cart path trajectory. The map correlation algorithm must compare potential trajectories within the reasonable limits of the dead reckoning error sources. A cost function (weighting technique) is created which is the sum of the error in position between the dead reckoning solution and the cart path map; the sum being taken across a sequence of dead reckoning solutions. When a good match is found to the dead reckoning trajectory, the trajectory is adjusted by the offset, rotation, or scale and checked again, iterating over the possible values of these error sources. The resolution of the iteration depends upon the accuracy of the fit desired.

After iterating, the best fit (lowest cost) combination of dead reckoning errors compared to the sequence of cart path segments is used to update the navigation solution. The update consists simultaneously of the offset, scale, and rotation errors. These update the position, wheel scale factor, and heading errors, respectively.

A drawback to this approach is the computational requirements for performing the iterative map correlation. This type of computation typically requires the use of a DSP (digital signal processing) specific processor, which has special hardware for implementing correlation algorithms such as this one.

Preferably, the communications system between the base station and the carts is the same as that described in the '692 (and the '905) application, to which the reader is referred. For present purposes, it is sufficient to note that the RF transceiver uses frequency shift keying (FSK) as a digital modulation technique, with bandwidth efficiency for data transmission achieved using a variable length packet communications network with precise time division multiplexing (TDM). All information is sent and received in time slices on a single frequency. Each cart, and the base station, transmits its information in a precise time slot, the slots being allocated to assure that only one is transmitting at any given instant of time, to avoid any need for base station polling of the carts to acquire a transmission link. The system is keyed from the broadcast transmissions of the base station transmitter at the beginning of each integer second, and all carts are then synchronized for timing to the base station every second. All network participants are initialized to indicate when they are allowed to transmit, and thereafter, each may transmit in its own specific time slot asynchronous of direct base station timing control, except when the base station is to provide direct synchronization. Bit synchronization is also described in detail in the '295 and '905 applications.

The color monitor assembly 19 (FIG. 1A) is mounted on the underside of the golf cart roof with black bezel around the screen and flat black applied to the roof underside, for ease of viewing by the cart occupants in sunlight and without interfering with the driver's view of the cart path. A key pad assembly (not shown) is preferably mounted below the base of the monitor, with software controllable, soft keys, readily accessible to the cart operator. A map of each hole on the course is displayed on the monitor screen as that hole is being played, with automatic transition from each hole map to the next on the display screen as the cart approaches the tee boxes for the next hole. Yardage data from the cart to a selected feature of the hole (including the cup) is selectively displayed on the cart monitor by appropriate operation of the keys. Selection of a feature to which the yardage measurement is desired is made by moving a cursor arrow on the screen to that feature (not shown) by means, for example, of a joy stick assembly, a trackball assembly, or four to eight arrows keys that enable the arrow to be moved to the desired location with ease.

The carts calculate their positions using their DR navigation systems, as described in the '692 application. The mobile RF transmitter of the respective cart transmits serial data to the base station receiver identifying the cart and its location every few seconds. By this means, the specific location of each cart is determined and identified on the digital mapping display on the base station monitor, and, as well, on the respective cart's own monitor display screen. Elimination of the error buildup attributable to the components or other aspects of the DR navigation system is handled by the present invention in the manner described above.

Although certain preferred embodiments and methods have been described to illustrate the best mode presently contemplated of practicing the invention, it will be clear to those skilled in the art that modifications may be made without departing from the true spirit and scope of the invention. Accordingly, it is intended that the invention be limited only to the extent required by the appended claims and the rules and principles of the relevant law.

What is claimed is:

1. A method for obtaining accurate measurements of distance of a golf cart equipped with a computerized dead reckoning navigation (DRN) system from features of interest on a hole of a golf course including tee boxes, cups, water hazards, sand traps, rough areas adjacent fairway, and cart path, to assist golfers in playing the hole, wherein the golf course has been surveyed so that fixed positions of at least some of said features including the cart path are known and are part of a map of the course stored in the data base of the computerized DRN system, the DRN system having a capability to detect and indicate the position of said golf cart on the course map but undergoing a gradual increase in error of indicated position of the golf cart as the cart is driven about the course during play, thereby introducing error buildup into each said measurement of distance of the cart to said features, said method comprising the steps of:

examining by means of the DRN system whether the golf cart is on or off the cart path during at least part of the time that said cart is in use in play of each hole; and at a point in time when the cart is determined to be on the cart path during said play, calibrating the DRN system, including Kalman filter processing information derived in said DRN system from driving said cart, to substantially eliminate the built up error and thereby restore accuracy of measurements performed by the DRN system at that point in time by substantially reducing the discrepancy between (a) a point on the cart path determined to be the actual approximate position of the golf cart and (b) the indicated position of the golf cart removed from said point on the cart path.

2. A method for obtaining accurate measurements of distance of a golf cart equipped with a computerized dead reckoning navigation (DRN) system from features of interest on a hole of a golf course including tee boxes, cups, water hazards, sand traps, rough areas adjacent fairway, and cart path, to assist golfers in playing the hole, wherein the golf course has been surveyed so that fixed positions of at least some of said features including the cart path are known and are part of a map of the course stored in the data base of the computerized DRN system, the DRN system having a capability to detect and indicate the position of said golf cart on the course map by virtue of including at least one wheel sensor on the golf cart from which to encode wheel rotations and thereby determine position and speed of the golf cart and a compass for determining magnetic heading of the golf cart, but said DRN system undergoing a gradual increase in error of indicated position of the golf cart as the cart is driven about the course during play, thereby introducing error buildup into each said measurement of distance of the cart to said features with contribution thereto from each of said wheel sensor and said compass, said method comprising the steps of:

examining by means of the DRN system whether the golf cart is on or off the cart path during at least part of the time that said cart is in use in play of each hole; and at a point in time when the cart is determined to be on the cart path during said play, calibrating the DRN system, including Kalman filter processing information derived in said DRN system from driving said cart, to substantially eliminate the built up error and thereby restore accuracy of measurements performed by the DRN system at that point in time by substantially reducing the discrepancy between (a) a point on the cart path determined to be the actual approximate position of the golf cart and (b) the indicated position of the golf cart removed from said point on the cart path.

3. A method for obtaining accurate measurements of distance of a golf cart equipped with a computerized navigation system from features of interest on a hole of a golf course including tee boxes, cups, water hazards, sand traps, rough areas adjacent fairway, and cart path, to assist golfers in playing the hole, wherein the golf course has been surveyed so that fixed positions of at least some of said features including the cart path are known and are part of a map of the course stored in the data base of the computerized navigation system, the navigation system having a capability to detect and indicate the position of said golf cart on the course map but undergoing a gradual increase in error of indicated position of the golf cart as the cart is driven about the course during play, thereby introducing error buildup into each said measurement of distance of the cart to said features, said method comprising the steps of:

examining by means of the navigation system whether the golf cart is on or off the cart path during at least part of the time that said cart is in use in play of each hole, including establishing search zones overlying a sequence of respective generally straight line sections of the cart path in a portion of the stored map of the golf course on a display screen in the golf cart, and identifying one of said zones as being the most likely real time location of the golf cart, said search zones being established as substantially rectangular with side boundaries generally parallel to the section of the path within the respective zone and constituting predetermined limits that define the cart as being off path whenever an icon representative of the cart on the display screen is outside said limits; and at a point in time when the cart is determined to be on the cart path during said play, calibrating the navigation system, including searching successive segments of the cart path in said identified zone to determine the specific segment on which said point on the cart path lies and moving the indicated position of the cart to said point on the cart path, to substantially eliminate the built up error and thereby restore accuracy of measurements performed by the navigation system at that point in time by substantially reducing the discrepancy between (a) a point on the cart path determined to be the actual approximate position of the golf cart and (b) the indicated position of the golf cart removed from said point on the cart path.

4. A method for obtaining accurate measurements of distance of a golf cart equipped with a computerized navigation system from features of interest on a hole of a golf course including tee boxes, cups, water hazards, sand traps, rough areas adjacent fairway, and cart path, to assist golfers in playing the hole, wherein the golf course has been surveyed so that fixed positions of at least some of said features including the cart path are known and are part of a map of the course stored in the data base of the computerized navigation system, the navigation system having a capability to detect and indicate the position of said golf cart on the course map but undergoing a gradual increase in error of indicated position of the golf cart as the cart is driven about the course during play, thereby introducing error buildup into each said measurement of distance of the cart to said features, said method comprising the steps of:

examining by means of the navigation system whether the golf cart is on or off the cart path during at least part of the time that said cart is in use in play of each hole; and at a point in time when the cart is determined to be on the cart path during said play, calibrating the navigation system including searching the data base of cart path segments to locate the segment closest to the indicated position of the golf cart, to substantially eliminate the built up error and thereby restore accuracy of measurements performed by the navigation system at that point in time by substantially reducing the discrepancy between (a) a point on the cart path determined to be the actual approximate position of the golf cart and (b) the indicated position of the golf cart removed from said point on the cart path; said searching including:

starting the search at a section of the cart path on which the golf cart was last indicated to be positioned on the measurement system, and thereafter first searching said section for a segment thereof which lies substantially parallel to the direction of travel of the cart, including:

searching forward and backward along said section and testing cart path segments there of for substantially the same vector direction as the heading of the golf cart within limits determined by the estimated extent of compass errors and map errors, and if a substantial match of vector direction of a segment and heading of the golf cart is found in the course of the search, verifying that the indicated position of the golf cart lies between imaginary lines extending normal to the cart path segment for which said match was found, at the endpoints of said segment, and if multiple segments are found with said substantial match, selecting that one of the multiple segments which lies closest to and within a predetermined distance limit from said indicated position of the golf cart, or, if no match is found, or if it is determined that the golf cart has not been on a cart path recently, establishing substantially rectangular search zones overlying the stored map of the golf course, with at least some of the search zones overlapping each other, and searching the cart path segments in only the zone which encompasses the cart's indicated position.

5. The method of claim 4, including searching the cart path segments in multiple zones if the indicated cart position lies in an area where said multiple zones overlap one another.

6. A method of calibrating a golf cart navigation system used to compute and display position of the cart and relative real time distance from the cart to selected features of a golf course on which the cart is used, said method comprising:

storing a map of the cart path for said golf course in the data base of the navigation system; and periodically correcting the position of the cart on the golf course as indicated by the navigation system, from a comparison between selected parameters of the indicated cart position and selected parameters of the stored course map, for use in calibrating the navigation system according, at least in part, to the actual real time position of the cart on said course, wherein said comparison is performed by establishing an overlay of substantially rectangular search zones along successive sections of the cart path for a portion of the course of interest on the stored map in the navigation system, and searching within selected ones of the zones for a cart path segment having a direction and location which are closest to the real time heading and position of the cart, and after said segment is found, verifying that the indicated position of the cart lies within endpoint boundaries established for that segment of the cart path.

7. A method of calibrating a golf cart navigation system used to compute and display position of the cart and relative real time distance from the cart to selected features of a golf course on which the cart is used, said method comprising:

storing a map of the cart path for said golf course in the data base of the navigation system; and periodically correcting the position of the cart on the golf course as indicated by the navigation system, from a comparison between selected parameters of the indicated cart position and selected parameters of the stored course map, for use in calibrating the navigation system according, at least in part, to the actual real time position of the cart on said course;

said method further including a global positioning satellite (GPS) calibration system, and said comparison constituting a map-matching or map-correlation technique employed as an alternative to the GPS calibration system at least occasionally when the cart is restricted to the cart path.

* * * * *